Dec. 14, 1965

M. J. WRIGHT 3,223,852

SWITCHING CIRCUITS

Filed Sept. 10, 1962

United States Patent Office 3,223,852

Patented Dec. 14, 1965

3,223,852

SWITCHING CIRCUITS

Maurice James Wright, Harborne, Birmingham, England, assignor to Joseph Lucas (Industries) Limited, Birmingham, England Filed Sept. 10, 1962, Ser. No. 222,388

Claims priority, application Great Britain, Sept. 21, 1961, 33,799/61

4 Claims. (Cl. 307—88.5)

Figures 1, 2:
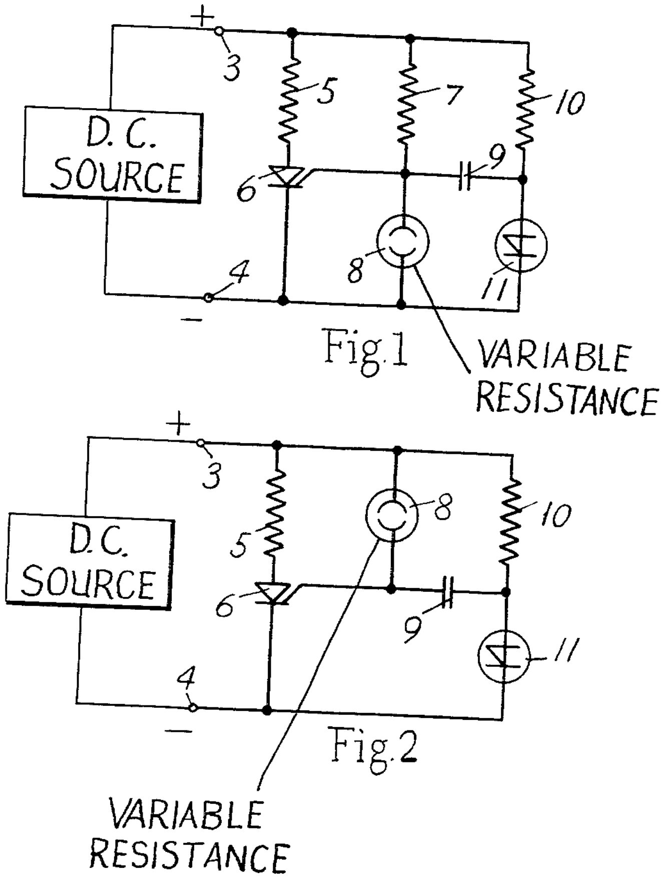

The object of this invention is to provide in a convenient form a switching circuit whereby the flow of current through a load may be controlled by a smaller current flowing through a further circuit component.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674.

A switching circuit in accordance with the invention comprises in combination a switchable rectifier adapted for connection to a source of power, a load in the anode-cathode of the switchable rectifier, a free-running oscillator which when the switchable rectifier is on operates in a manner to switch the switchable rectifier off, and variable resistance means operable to switch on the switchable rectifier only when the magnitude of the resistance reaches a predetermined value.

In the accompanying drawings FIGURE 1 is a circuit diagram illustrating one example of the invention and FIGURE 2 illustrates a modification of the example seen in FIGURE 1.

Referring to FIGURE 1, there are provided first and second terminals 3, 4 adapted for connection to a voltage source so as to be of relatively positive and negative polarity. The terminal 3 is connected through a load 5 to the anode of a switchable rectifier 6 having its cathode connected to the terminal 4, whilst the gate is connected through a resistor 7 to the terminal 3 and through a photo-sensitive device 8 to the terminal 4. Moreover, a point intermediate the resistor 7 and the device 8 is connected to the terminal 3 through a capacitor 9 and a resistor 10 in series, and to the terminal 4 through the capacitor 9 and a four-layer diode 11 in series. The diode 11 is a well-known device having the characteristic that when a predetermined voltage is applied across it, it will break down and thereafter conduct until the current flowing through it falls substantially to zero.

In operation, assuming that the switchable rectifier has just commenced to conduct, the capacitor 9 is charged through the resistor 10 and the gate and cathode of the rectifier 6 until it reaches a voltage at which the four-layer diode 11 breaks down. At this point the capacitor discharges through the gate and cathode of the rectifier 6 and the diode 11, so that the switchable rectifier is switched off. When the capacitor 9 is fully discharged, the four-layer diode is cut off because the current flowing through it falls to zero, and the capacitor starts to charge again. At the same time current flows through the resistor 7 and thence to the terminal 4 through the gate and cathode of the switchable rectifier 6 and the photo-sensitive device 8 in parallel, and the arrangement is such that provided the resistance of the device 8 is above a predetermined value sufficient current flows through the gate and cathode to switch on the switchable rectifier whereafter the cycle is repeated. However, if the resistance of the device 8 is below the predetermined value the capacitor will become fully charged and the cycle will be repeated without switching on the switchable rectifier until the resistance of the device rises. It will be understood that the predetermined value depends upon whether or not the device 8 is illuminated.

In the modification shown in FIGURE 2, the resistor 7 is omitted, and the photo-sensitive device is connected between the gate and the terminal 3. The charging and discharging paths of the capacitor 9 are the same, the discharge current being sufficient to turn off the rectifier 6, but the charging current being insufficient to turn the rectifier 6 on. Current for switching the rectifier 6 on flows through the device 8, but the magnitude of this current is only sufficient to switch the rectifier 6 on if the resistance of the device is below a predetermined value.

It will be appreciated that the photo-sensitive device 8 could be replaced by any other convenient variable resistance means the resistance of which can be varied in response, for example, to pressure. Moreover, other forms of oscillator could be employed in place of the capacitor and four-layer diode.

Having thus described my invention what I claim as new and desire to secure by Letters Patent is:

1. A switching circuit comprising in combination a switchable rectifier adapted for connection to a D.C. source, said switchable rectifier having an anode, a cathode and a gate and being switched on by a predetermined positive gate-cathode current and switched off by a predetermined negative gate-cathode current, a load in the anode circuit of the switchable rectifier, a free-running oscillator including a capacitor in series with the gate and cathode of the switchable rectifier, said capacitor being alternately charged and discharged in use and the discharge current serving to switch off the switchable rectifier if the latter is conductive, and variable resistance means connected in circuit with said capacitor and said switchable rectifier for determining whether or not the switchable rectifier is switched on during charging of the capacitor.

2. A switching circuit as claimed in claim 1 in which the oscillator includes a four-layer diode connected in a circuit bridging said capacitor, and arranged to break down when the capacitor is charged to a predetermined level and provide a discharge path for the capacitor.

3. A switching circuit comprising in combination first and second terminals for connection to a D.C. source so as to be positive and negative in use respectively, a switchable rectifier having its anode and cathode connected to the first and second terminals respectively, said switchable rectifier having an anode, a cathode and a gate and being switched on by a predetermined positive gate-cathode current and switched off by a predetermined negative gate-cathode current, a load in the anode circuit, a capacitor and a four-layer diode connected in series between the gate of the switchable rectifier and the second terminal, a resistor connected between the first terminal and a point intermediate the capacitor and four-layer diode, a second resistor through which the gate is connected to the first terminal, and variable resistance means through which the gate is connected to the first terminal, the arrangement being such that the discharge current of the capacitor when the four-layer diode breaks down will be sufficient to switch off the switchable rectifier if it is conductive, and the switchable rectifier will be switched on when the capacitor is charging providing the resistance of the variable resistance means is above a predetermined value.

4. A switching circuit comprising in combination first and second terminals for connection to a D.C. source so as to be positive and negative in use respectively, a switchable rectifier having its anode and cathode connected to the first and second terminals respectively, said switchable rectifier having an anode, a cathode and a gate and being switched on by a predetermined positive gate-cathode current and switched off by a predetermined negative gate-cathode current, a load in the anode circuit, a capacitor and a four-layer diode connected in series between the gate of the switchable rectifier and the second terminal, a resistor connected between the first terminal and a point intermediate the capacitor and four-layer diode and variable resistance means through which the gate is connected to the first terminal, the arrangement being such that the discharge current of the capacitor when the four-layer diode breaks down will be sufficient to switch off the switchable rectifier if it is conductive, and the switchable rectifier will be switched on when the capacitor is charging provided the resistance of the variable resistance means is below a predetermined value.

References Cited by the Examiner

UNITED STATES PATENTS 3,001,138 9/1961 Jacobs et al. ---------- 328—77

ARTHUR GAUSS, *Primary Examiner.*